United States Patent
Sardesai et al.

(10) Patent No.: US 12,045,778 B2
(45) Date of Patent: Jul. 23, 2024

(54) CONNECTING JOB SEEKERS WITH TALENT SEEKERS

(71) Applicant: Microsoft Technology Licensing, LLC, Redmond, WA (US)

(72) Inventors: Kapil Sardesai, Karnataka (IN); Sujith Surendran, Karnataka (IN); Santhosh Venkata Rama Siva Thankala Gani, Karanataka (IN); Prashanth Nimmagadda, Bangalore (IN); Nikhil Chandna, Karnataka (IN); Kala Sagar Pogiri, Karnataka (IN); Mohammad Kazi, Karnataka (IN); Roopali Rawat, Karnataka (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 681 days.

(21) Appl. No.: 16/556,848

(22) Filed: Aug. 30, 2019

(65) Prior Publication Data

US 2021/0065129 A1 Mar. 4, 2021

(51) Int. Cl.
*G06Q 10/1053* (2023.01)
*G06F 16/903* (2019.01)
(Continued)

(52) U.S. Cl.
CPC ............. *G06Q 10/1053* (2013.01); *G06F 16/90344* (2019.01); *G06F 16/9038* (2019.01); *G06F 18/2113* (2023.01)

(58) Field of Classification Search
CPC .............. G06Q 10/1053; G06Q 50/01; G06F 18/2113; G06F 16/90344; G06F 16/9038
See application file for complete search history.

(56) References Cited

U.S. PATENT DOCUMENTS

2012/0095931 A1* 4/2012 Gurion ............... G06Q 10/1053
  705/321
2014/0180945 A1* 6/2014 Hoque ............... G06Q 10/1053
  705/321
(Continued)

FOREIGN PATENT DOCUMENTS

WO WO-2015136555 A2 * 9/2015 ........... G06F 16/285

OTHER PUBLICATIONS

Hernandez, Jessica "How to Find Out Who Posted that Job on LinkedIn" LinkedIn Oct. 28, 2018; available at: https://www.linkedin.com/pulse/how-find-out-who-posted-job-linkedin-jessica-h- (Year: 2015).*

*Primary Examiner* — Brendan S O'Shea
(74) *Attorney, Agent, or Firm* — KDW FIRM PLLC

(57) ABSTRACT

Apparatuses, computer readable medium, and methods are disclosed for determining talent seekers. The apparatus, computer readable medium, and methods may include importing a job posting from an external source into a connection network system. The apparatus, computer readable medium, and methods may include deter mining a company stored in the connection network system that is offering the job, and determining talent seekers associated with the company, where the talent seekers are members of the connection network system. The apparatus, computer readable medium, and methods may include determining a matching score between each of the talent seekers and the job and a job seeker and selecting a talent seeker with a highest matching score. The apparatus, computer readable medium, and methods may include causing to be displayed to the job seeker a user interface screen that enables the job seeker to message the talent seeker with the highest matching score.

17 Claims, 12 Drawing Sheets

(51) Int. Cl.
*G06F 16/9038* (2019.01)
*G06F 18/2113* (2023.01)

(56) References Cited

U.S. PATENT DOCUMENTS

| | | | |
|---|---|---|---|
| 2015/0112765 A1* | 4/2015 | Sundaresh | G06Q 50/01 705/7.31 |
| 2015/0220884 A1* | 8/2015 | Kabdebon | G06Q 10/1053 705/321 |
| 2015/0317607 A1* | 11/2015 | Petrillo | G06F 3/0482 705/321 |
| 2018/0189740 A1* | 7/2018 | Al Jadda | G06Q 10/1053 |
| 2019/0019160 A1* | 1/2019 | Champaneria | G06N 5/04 |

\* cited by examiner

CONNECTING JOB SEEKERS WITH TALENT SEEKERS

TECHNICAL FIELD

Some embodiments pertain to determining talent seekers for job seekers based on characteristics of the talent seekers and job seekers. Some embodiments pertain to determining talent seekers associated with job postings.

BACKGROUND

A connection network system may import hundreds of millions of job postings. The job postings may include data such as the name of the company, the location of the company, etc. However, it may be difficult to determine whether a connection network system includes a talent seeker that may be contacted regarding the job by a job seeker who is a member of the connection network system.

DETAILED DESCRIPTION

The present disclosure describes methods, systems and computer program products for identifying and generating relevant content items. In the following description, for purposes of explanation, numerous specific details are set forth in order to provide a thorough understanding of the various aspects of different embodiments of the present invention. It will be evident, however, to one skilled in the art, the at the present invention may be practiced without all of the specific details and/or with variations permutations and combinations of the various features and elements described herein.

A system is provided that determines talent seekers that job seekers may contact. The system may import many jobs from external sites, e.g., there may be 10's of millions of jobs that are imported into the connection network system (see Table 3) and only 100's of thousands of jobs that are directly posted within the connection network system (see Table 1). The system may use the information from the imported jobs to determine members within the connection network system that are talent seekers associated with the job. The system provides a user interface (UI) for the job seekers to communicate with the talent seekers. Empirical data indicates that a job seeker is more likely to be hired for a job if the job seeker can contact a talent seeker. Additionally, the system determines talent seekers that a job seeker may contact independent of a particular job. The system enables the talent seekers to limit a number of contacts with job seekers. Systems, computer readable media, and methods are provided that solve a technical problem of determining talent seekers for job seekers that are more likely to respond to the job seeker within a connection network system. The job seeker having talent seekers that are more likely to respond to the job seeker provides the benefit that the job seeker will use their time contacting talent seekers that are more likely to respond to the job seeker, and the job seeker may be more likely to contact recommended talent seekers. Moreover, the number of contacts to talent seekers may be reduced so that the talent seekers are more likely to respond to the job seekers and may be more likely to use the connection network system to find job seekers for a job.

Figure 1:
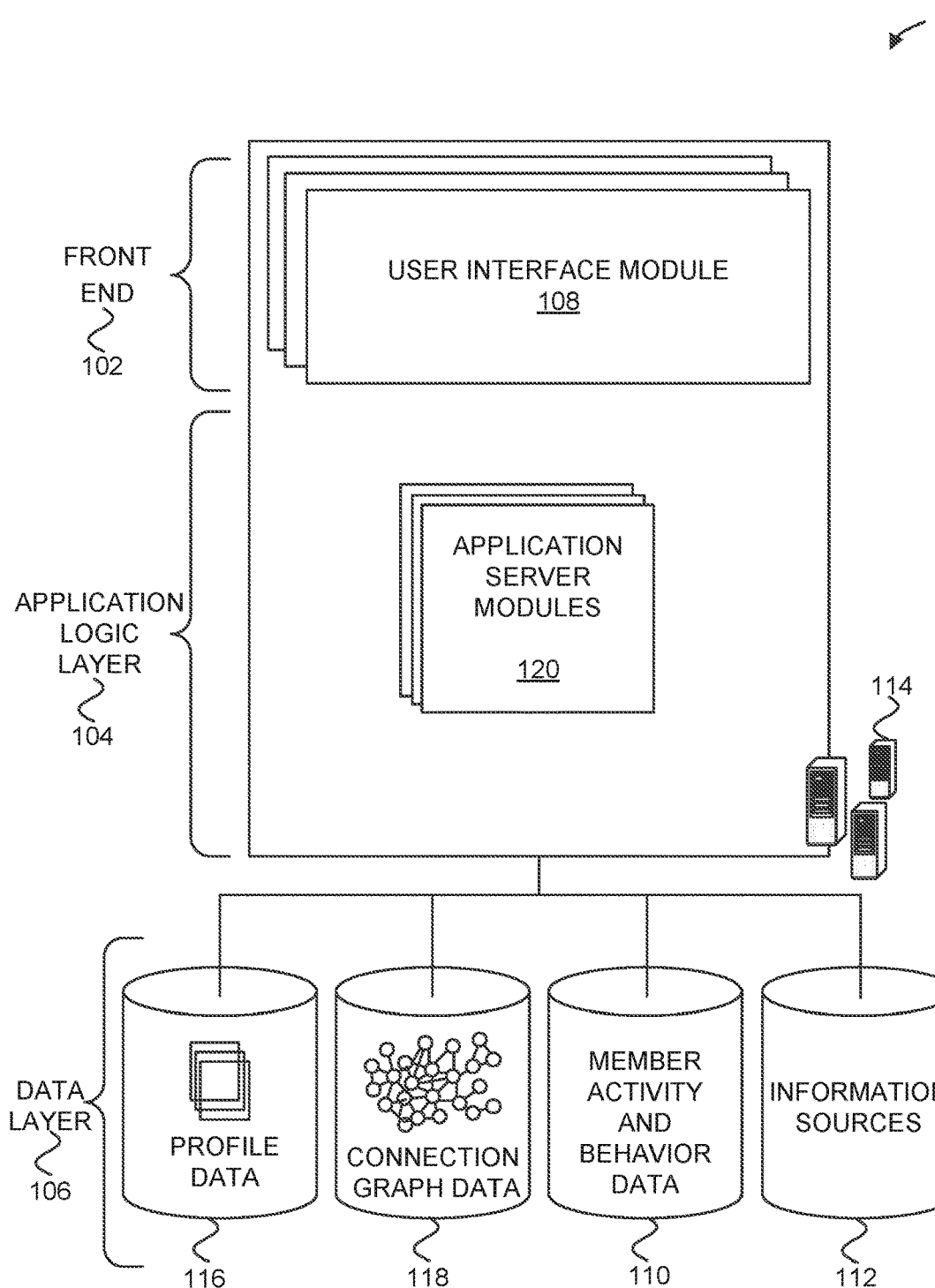
FIG. 1 is a block diagram of a connection network system, in accordance with some embodiments.

FIG. 1 is a block diagram of a connection network system 100, in accordance with some embodiments. The connection network system 100 may be based on a three-tiered architecture, comprising a front-end layer 102, application logic layer 104, and data layer 106. Some embodiments implement the connection network system 100 using different architectures. The connection network system 100 may be implemented on one or more computers 114. The computers 114 may be servers, personal computers, laptops, portable devices, etc. The computers 114 may be distributed across a network. The connection network system 100 may be implemented in a combination of software, hardware, and firmware.

As shown in FIG. 1, the front end 102 includes user interface modules 108. The user interface modules 108 may be one or more web services. The user interface modules 108 receive requests from various client-computing devices, and communicate appropriate responses to the requesting client devices. For example, the user interface modules 108 may receive requests in the form of Hypertext Transport Protocol (HTTP) requests, or other web-based, application programming interface (API) requests. The client devices (not shown) may be executing conventional web browser applications, or applications that have been developed for a specific platform to include any of a wide variety of mobile devices and operating systems.

As shown in FIG. 1, the data layer 106 includes profile data 116, connection graph data 118, member activity and behaviour data 120, and information sources 112. Profile data 116, connection graph data 118, and member activity and behaviour data 120, and/or information sources 112 may be databases. One or more of the data layer 106 may store data relating to various entities represented in a connection graph. In some embodiments, these entities include members, companies, and/or educational institutions, among possible others. Consistent with some embodiments, when a person initially registers to become a member of the connection network system 100, and at various times subsequent to initially registering, the person will be prompted to provide some personal information, such as his or her name, age (e.g., birth date), gender, interests, contact information, home town, address, the names of the member's spouse and/or family members, educational background (e.g., schools, majors, etc.), current position title including name of company, position description, industry, employment history, skills, professional organizations, and so on. This information is stored as part of a member's member profile, for example, in profile data 116. The data layer 106 may include companies 212, jobs 208, 502, members 210, talent seekers 302, job seekers 402, etc.

With some embodiments, a member's profile data will include not only the explicitly provided data, but also any number of derived or computed member profile attributes and/or characteristic, which may become part of one of more of profile data 116, connection graph data 118, member activity and behaviour data 110, and/or information sources 112.

Once registered, a member may invite other members, or be invited by other members, to connect via the connection network service. A company may be a member. A "connection" may require a bi-lateral agreement by the members, such that both members acknowledge the establishment of the connection, e.g., connections 318 or connection 418. Similarly, with some embodiments, a member may elect to "follow" another member. In contrast to establishing a "connection", the concept of "following" another member typically is a unilateral operation, and at least with some embodiments, does not require acknowledgement or approval by the member that is being followed. When one member follows another, the member who is following may receive automatic notifications about various activities undertaken by the member being followed. In addition to following another member, a user may elect to follow a company, a topic, a conversation, or some other entity. In general, the associations and relationships that a member has with other members and other entities (e.g., companies, schools, etc.) become part of the connection graph data 118. With some embodiments the connection graph data 118 may be implemented with a graph database, which is a particular type of database that uses graph structures with nodes, edges, and properties to represent and store data. In this case, the connection graph data 118 reflects the various entities that are part of the connection graph, as well as how those entities are related with one another.

With various alternative embodiments, any number of other entities might be included in the connection graph data 118, and as such, various other databases may be used to store data corresponding with other entities. For example, although not shown in FIG. 1, consistent with some embodiments, the system may include additional databases for storing information relating to a wide variety of entities, such as information concerning various online or offline people, position announcements, companies, groups, posts, job posts, slide shares, and so forth.

With some embodiments, the application server modules 120 may include one or more activity and/or event tracking modules, which generally detect various user-related activities and/or events, and then store information relating to those activities/events in, for example, member activity and behaviour data 110. For example, the tracking modules may identify when a user makes a change to some attribute of his or her member profile, or adds a new attribute and may trigger waterloo member-attribute processor to store the change in member activity and behaviour data 110. Additionally, a tracking module may detect the interactions that a member has with different types of content. For example, a tracking module may track a member's activity with respect to position announcements, e.g. position announcement views, saving of position announcements, applications to a position in a position announcement, explicit feedback regarding a position announcement (e.g., not interested, not looking, too junior, not qualified, information regarding the position the member would like, a location member wants to work, do not want to move, more like this, etc.), position search terms that may be entered by a member to search for position announcements.

Such information may be used, for example, by one or more recommendation engines to tailor the content presented to a particular member, and generally to tailor the user experience for a particular member. Information sources 112 may be one or more additional information sources. For example, information sources 112 may include external sources that include job posting and company information that may be used by import jobs module 202 to generate jobs 208.1.

The application server modules 120, which, in conjunction with the user interface module 108, generate various user interfaces (e.g., web pages) with data retrieved from the data layer 106. In some embodiments, individual application server modules 120 are used to implement the functionality associated with various applications, services and features of the connection network service. For instance, a messaging application, such as an email application, an instant messaging application, or some hybrid or variation of the two, may be implemented with one or more application server modules 120. Of course, other applications or services may be separately embodied in their own application server modules 120. In some embodiments applications may be implemented with a combination of application service modules 120 and user interface modules 108. For example, contact talent seeker module 902 or confirm job module 1002 may be implemented with a combination of back-end modules, front-end modules, and modules that reside on a user's computer (not illustrated). For example, the connection network system 100 may download a module to a web browser running on a user's computer, which may communicate with an application server module 120 running on a server 114 which may communicate with a module running on a back-end database server (not illustrated).

The connection network system 100 may provide a broad range of applications and services that allow members the opportunity to share and receive information, often customized to the interests of the member. For example, in some embodiments, the connection network system 100 may include generate identify talent seeker module 216, which may be an application server module 120.

With some embodiments, members of a connection network service may be able to self-organize into groups, or interest groups, organized around a subject matter or topic of interest. Accordingly, the data for a group may be stored in connection graph data 118. When a member joins a group, his or her membership in the group may be reflected in the connection graph data 118. In some embodiments, members may subscribe to or join groups affiliated with one or more companies. For instance, with some embodiments, members of the connection network service may indicate an affiliation with a company at which they are employed, such that news and events pertaining to the company are automatically communicated to the members. With some embodiments, members may be allowed to subscribe to receive information concerning companies other than the company with which they are employed. Here again, membership in a group; a subscription or following relationship with a company or group, as well as an employment relationship with a company, are all examples of the different types of relationships that may exist between different entities, as defined by the connection graph and modelled with the connection graph data 118.

In some embodiments, the connection network system 100 may include identify talent seeker module 216, which includes or has an associated publicly available API that enables third-party applications to invoke the functionality of the respective module or application. In some embodiments the connection network system 100 is a social networking system. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the disclosed embodiments with unnecessary detail, various functional modules and engines that are not germane to conveying an understanding of the inventive subject matter have been omitted from FIG. 1.

However, a skilled artisan will readily recognize that various additional functional modules and engines may be used with a connection network system, such as that illustrated in FIG. 1, to facilitate additional functionality that is not specifically described herein. Furthermore, the various functional modules and engines depicted in FIG. 1 may reside on a single server computer or may be distributed across several server computers in various arrangements. Moreover, although depicted in FIG. 1 as a three-tiered architecture, the disclosed embodiments are by no means limited to such architecture.

Figure 2:
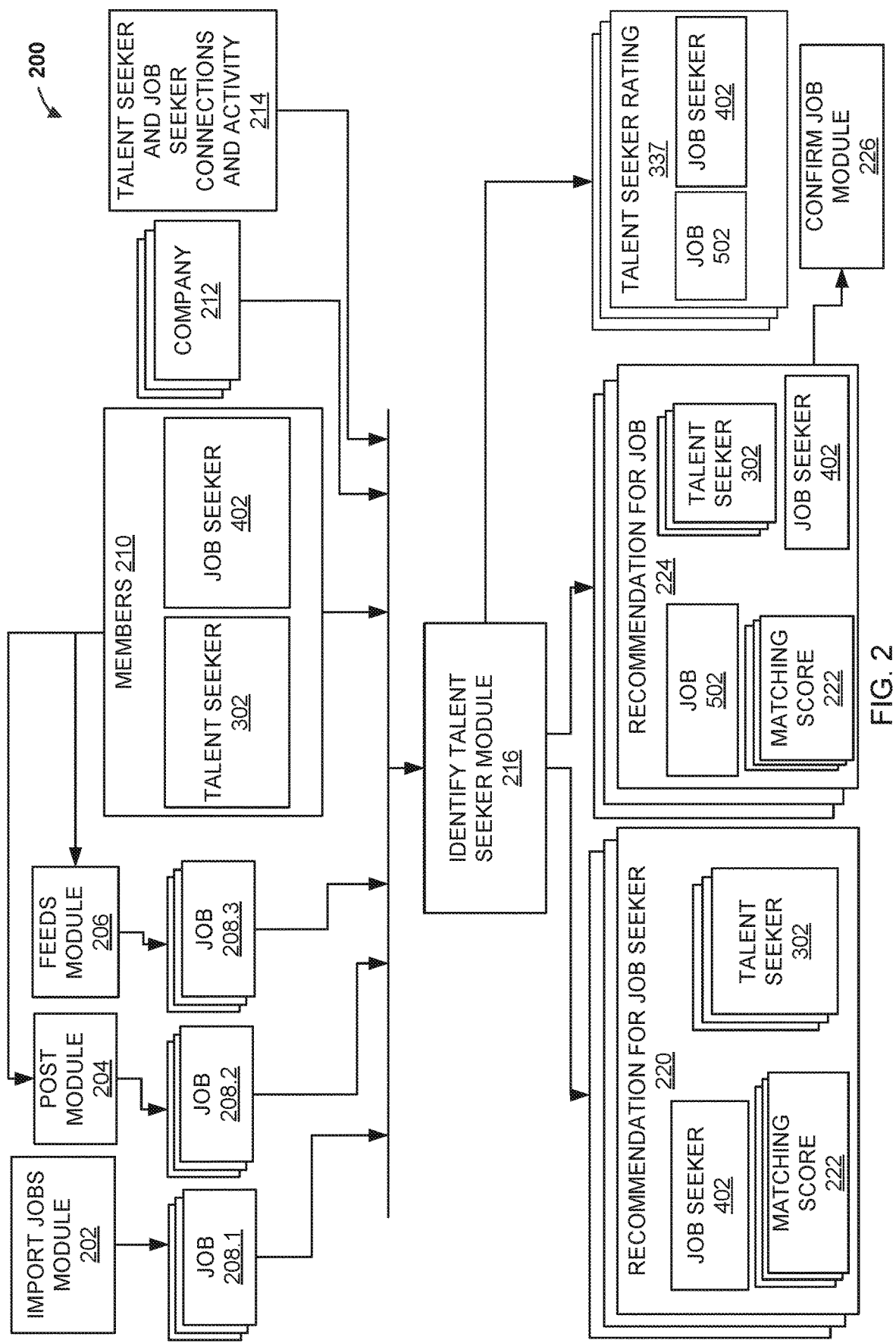
FIG. 2 illustrates a system for connecting job seekers with talent seekers, in accordance with some embodiments.

FIG. 2 illustrates a system 200 for connecting job seekers with talent seekers, in accordance with some embodiments. Illustrated in FIG. 2 is import jobs module 202, post 204, feeds 206, jobs 208, member 210, talent seeker 302, job seeker 402, company 212, talent seeker and job seeker connections and activity 214, identify talent seeker module 216, recommendation for job seeker 220, matching score 222, recommendation for job 224, and verify job with talent seeker module 226.

The system 200 for connecting job seekers 402 with talent seekers 302 may take jobs 208, member 210, companies 212, and talent seeker and job seeker connections and activity 214, and based on this information, identify talent seeker module 216 may determine talent seekers 402 for recommendation for job seeker 220 and recommendation for job 224.

Import jobs module 202 may import jobs 208.1 from outside the connection network system 100. The jobs 208.1 may not have complete information. Import jobs module 202 may create a job 502 within the connection network system 100. Some fields of the job 502 may not be valid or contain values, e.g., ID 604 of company 508, name 602 of company, etc. The type of posing 510 of the job 502 may be indicated as imported 514. Post module 204 may indicate that a member 210, e.g., a talent seeker 302, has posted a job 502. The job 502 may be posted with an indication of the poster 504, an indication of whether to show poster 506, a company 508, a job position 520, and a type of posting 510, e.g., basic 510 or premium 512. A talent seeker 302 may invoke post module 204, e.g., by taking action 350 of post job 356. Feeds module 206 examines the feed posts 322 of talent seekers 302 or members 210 and determines whether the feed posts 322 indicate that a talent seeker 302 is seeking a job seeker 402. If the feed posts 322 are determined to indicate a search for a job seeker 402, then a job 208.3 may be generated with information from the talent seeker 302 and the feed post 322 of the talent seeker 302. Type of posting 510 of the job 502 may be indicated as feed 522. In accordance with some embodiments, feed module 206 is configured to use entity recognition, natural language processing, quality posting classifications to identify jobs within the feed posts 322. Company 212 may be a company within the connection network system 100. Company 212 may be the same or similar as disclosed in conjunction with FIG. 6. Talent seeker and job seeker connections and activity 214 may be a history of the interactions of the talent seeker 302 and connections 318 (FIG. 3) of the talent seeker 302 as well as the interactions of the job seeker 402 and the connections 418 (FIG. 4) of the job seeker 402. Identify talent seeker module 216 may use the talent seeker and job seeker connections and activity 214 to determine matching score 222 and/or talent seeker rating 337.

Identify talent seeker module 216 determines recommendation for job 224 and/or recommendations for job seeker 218. Identify talent seeker module 216 may determine a talent seeker 402 associated with the job 502. In some embodiments, the job 502 has show poster 506 as being false, the name 602 of the company 508 not being set, poster 504 as not being set, and/or the ID 604 of the company 508 not being set. In some embodiments, identify talent seeker module 216 determines a company 508 for the job 502, and then determines talent seekers 302 associated with the company 508.

Figure 6:
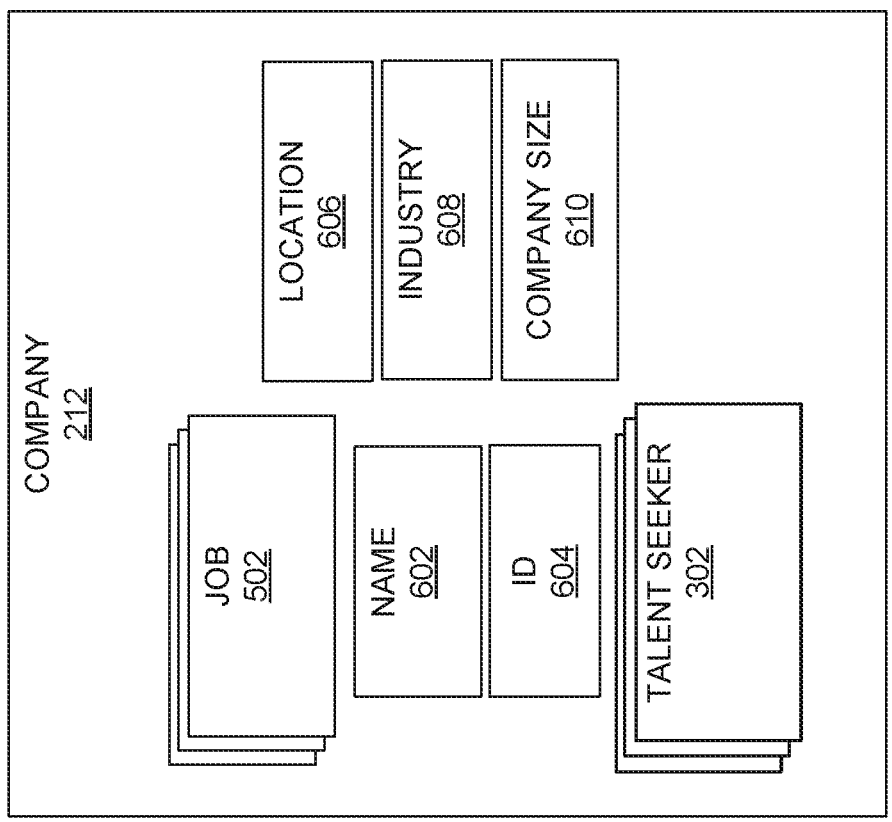
FIG. 6 illustrates a company, in accordance with some embodiments.

In some embodiments, identify talent seeker module 216 identifies the job 502 and if the poster 504 is valid, then identify talent seeker module 216 determines the poster 504 is the talent seeker 302. In some embodiments, identify talent seeker module 216 identifies the job 502 and if the ID 604 of the company 508 is valid, then identify talent seeker module 216 determines the talent seeker 302 based on talent seekers 302 that are part of the company 212 (FIG. 6).

In some embodiments, identify talent seeker module 216 identifies the job 502 and if the poster 504 is valid, then identify talent seeker module 216 determines the poster 504 is the talent seeker 302. In some embodiments, identify talent seeker module 216 identifies the job 502 and if the ID 604 of the company 508 is valid, then identify talent seeker module 216 determines the talent seeker 302 based on talent seekers 302 that are part of the company 212 (FIG. 6). In some embodiments, identify talent seeker module 216 examines talent seekers 302 that are part of the company 212 (FIG. 6) and determines a talent seeker 302 that is a best match for the job 502 of recommendation for job 224 or a best match for the job seeker 402 for recommendation for job seeker 220. In some embodiments, identify talent seeker module 216 determines a matching score 222 between the talent seeker 302 and the job seeker 402 and job 502. The matching score 222 may be the same or similar as the talent seeker rating 337.

In some embodiments, identify talent seeker module 216 examines talent seekers 302 that are part of the company 212 (FIG. 6) and selects all the talent seekers 302 that are part of the company 212 to display for recommendation for job seeker 220 and recommendation for job 224. In some embodiments, identify talent seeker module 216 examines talent seekers 302 that are part of the company 212 (FIG. 6) and selects talent seekers 302 that are talent professionals 308 or recruiters 310 as the talent seeker 402 for recommendation for job seeker 220 or recommendation for job 224. Row 5 of table 1 indicates that a mean number of job posters (e.g., talent seekers 302) for a company 212 in the USA may be only 1.5 so that all the talent seekers 402 associated with a company 212 may be presented to the job seeker 402 without overwhelming the job seeker 402 with talent seekers 302 to evaluate. In some embodiments, identify talent seeker module 216 determines a matching score 222 between the talent seeker 302 and the job seeker 402. The matching score 222 may be the same or similar as the talent seeker rating 337.

In some embodiments, identify talent seeker module 216 examines the information available on the connection network system 100 related to members 210 to rate whether members 210 are likely a talent seeker 302. For example, identify talent seeker module 216 may determine a talent seeker rating 337 that indicates the likelihood that a member 210 is actual a talent seeker 302. For example, a member 210 may receive a higher talent seeker rating 337 based on one or more of the following. The member 210 has a search history 326 that indicates searches that a talent seeker 302 would perform such as searching for job seekers 402 with particular skills 436, education, and/or years of experience 434. The member 210 has taken the action posted job 356 one or more times, which may be indicated in posting history 326. The member 210 has a title 316 that indicates they are a talent seeker 302, e.g., hiring manager, personnel manager, engineering manager, etc. The member 210 has one or more feed posts 322 that indicate the member 210 is a talent seeker 302, e.g., "I am seeking a programmer with at least 5 years experience." The member 210 has connections 318 with other talent seekers 302. The response history 328 of the member 210 indicates that the member 210 actively engages with other members 210 that are known job seekers 402. The member 210 has a high-quality profile as indicated in profile quality 330. Other information within the connection network system 100 may be used, e.g., information disclosed in conjunction with FIGS. 3-5. For example, identify talent seeker module 216 may rate member 210 to determine if a member 210 is a talent seeker 402 based on their use of recruiting talent seeking modules (not illustrated) that are provided by the connection network system 100.

In some embodiments, identify talent seeker module 216 confirms with the talent seeker 302 that the talent seeker 302 is associated with the job 502 or with a job position 520 before including the talent seeker 402 in the recommendation for job seeker 220 or recommendation for job 224. Confirm job module 226 may confirm with a talent seeker 302 that the talent seeker 302 is associated with a job 502, e.g., as disclosed in conjunction with FIG. 10.

In some embodiments, identify talent seeker module 216 determines matching scores for companies 212 stored in the connection network system 100. The matching scores are based on one or more of the following: comparing names 602 of the companies 212 stored in the connection network system 100 with a name indicated in the job posting, comparing locations 606 of the companies 212 stored in the connection network system with a location indicated in the job posting, comparing names 314 of talent seekers 302 employed by the companies 212 with a name of contact indicated in the job posting, comparing company sizes 610 of the companies 212 with a size of a company indicated in the job posting, and comparing industries 608 of the companies 212 with an industry of the company indicated in the job posting. The identify talent seeker module 216 may then select the company 212 based on the company 212 having a highest matching score for the companies 212 stored in the connection network system 100.

In some embodiments, identify talent seeker module 216 determines matching scores for talent seekers 302 associated with the company 212 that is determined to be offering the job 208. The matching scores are based on one or more of the following: comparing locations 317 of the talent seekers 302 with a location 422 of the job seeker 402, comparing connections 318 of the talent seekers 302 with other members 210 of the connection network system 100 with connections 418 of the job seeker 402 with other members 210 of the connection network system 100, comparing industries 324 of the talent seekers 302 with an industry 440 of the job seeker 402, comparing job searches 428 of the job seekers 402 with skills 334 and years of experience 332 of the job seeker 402, and comparing companies 212 of the talent seekers 302 with the company 212. In some embodiments, identify talent seeker module 216 selects the talent seeker 302 based on the talent seeker 302 having a highest matching score for the job seeker 402. In some embodiments, the identify talent seeker module 216 may select more than one talent seeker 402. In some embodiments, identify talent seeker module 216 may select a talent seeker 302 if the talent seeker 302 previously contacted the job seeker 402. In some embodiments, identify talent seeker module 216 may select a talent seeker 302 if the job seeker 402 previously appeared in search results from a search performed by the job seeker 402. In some embodiments, identify talent seeker module 216 may select a talent seeker 302 if the talent seeker 302 previously contacted a job seeker 402 that is close to the job seeker 402. The closeness of two job seekers 402 may be determined by matching one or of the fields discussed herein with fields such as title 420, education, years of experience 434, and skills 436 having a higher weight.

In some embodiments, identify talent seeker module 216 may rank the job seeker 402 based on their qualification for the job 502 or based on other job seekers 402 that the talent seekers 302 have contacted. Identify talent seeker module 216 may determine the talent seekers 302 to present to the job seeker 402 based on the relative ranking of the job seeker 402 compared to other job seekers 302. This may have the benefit of not presenting talent seekers 302 to the job seeker 402 that are unlikely to respond to the job seeker 402 as there are more talented job seekers 302 that the talent seeker 302 is more likely to respond to and the benefit of not overwhelming the talent seeker 302 with job seekers 302 that are not as qualified as other job seekers 302. It may also have the benefit of filtering out job seekers 402 that are not well qualified and send lots of messages to talent seekers 302. Recommendation for job seeker 220 and recommendation for job 224 may be stored in a database to facilitate querying a talent seeker 302 whether they are associated with the job 502 or whether the talent seeker 302 would be interested in a job seeker 402. For example, as described in conjunction with FIG. 10. In some embodiments, identify talent seeker module 216 may determine that a matching score 222 is lower for a job 502 and talent job 302 with a job seeker 402 if a number of applications 532 to the job 502 is above a threshold, e.g., if there are already 100 people that have applied to the job.

Figure 3:
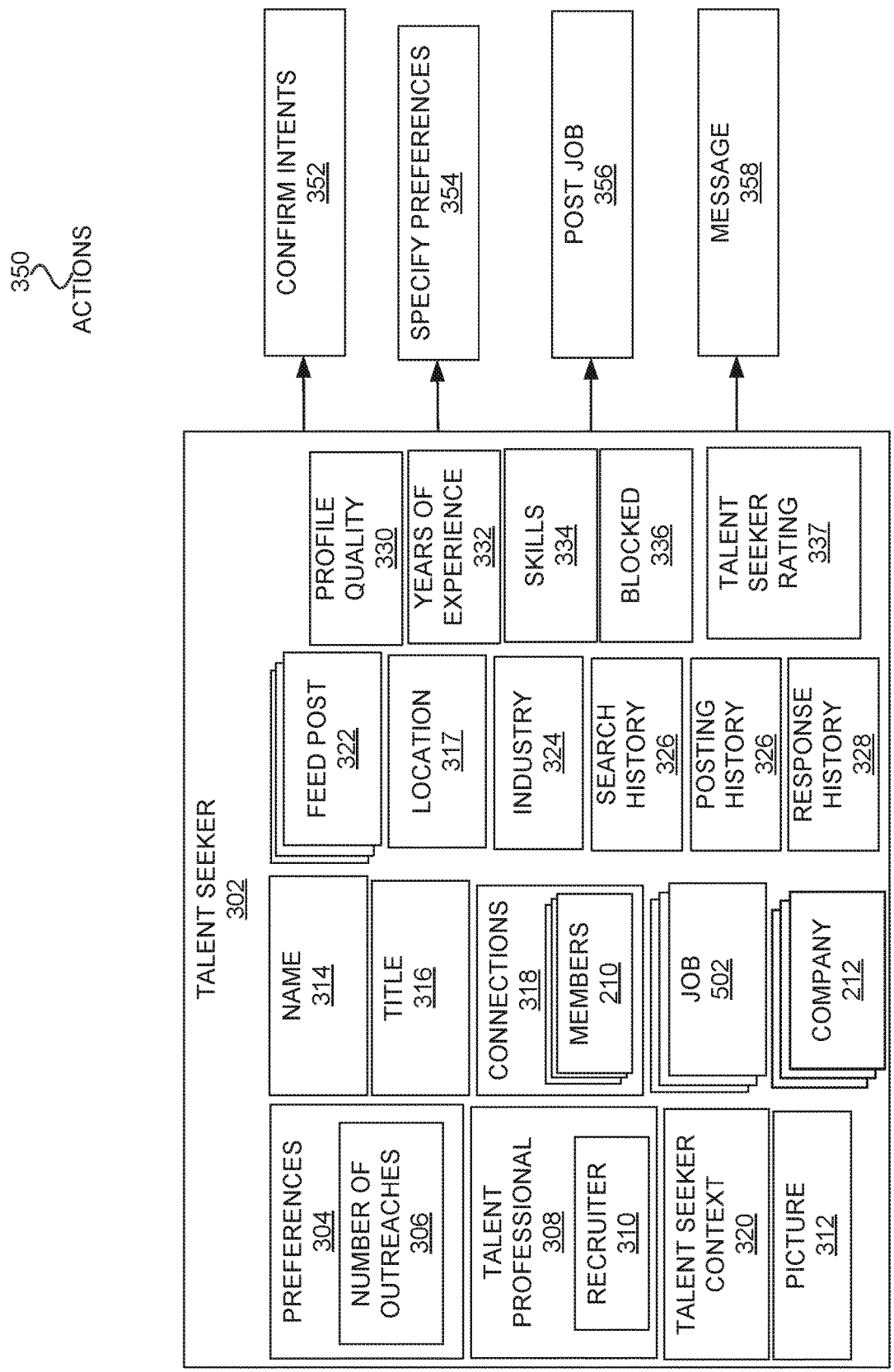
FIG. 3 illustrates a talent seeker, in accordance with some embodiments.

FIG. 3 illustrates a talent seeker 302, in accordance with some embodiments. FIG. 3 illustrates talent seeker 302 and actions 350. Talent seeker 302 may include preferences 304, number of outreaches 306, talent professional 308, recruiter 310, picture 312, name 314, title 316, location 317, connections 318, talent seeker context 320, members 210, job 502, feed post 322, industry 324, search history 326, posting history 326, response history 328, profile quality 330, years of experience 332, skills 334, blocked 336, and talent seeker rating 337.

The talent seeker 302 may be a member 210 of the connection network system 100. Preferences 304 may be preferences of the talent seeker 302 that relate to contacting or being contacted by job seekers 402. A number of out reaches 306 may be a limit on a number of times the talent seeker 302 would like to be contacted by a job seekers 402.

Talent professional 308 may indicate that the talent seeker 308 is a person that works in the area of hiring people for the company 212. Recruiter 310 indicates whether the talent seeker 302 is a recruiter. Talent seeker context 320 may be an intent of the talent seeker 302 to seek a job seeker 402. Picture 312 may be an image of the talent seeker 302. Name 314 may be a name of the talent seeker 302. Title 316 may be a job title of the talent seeker 302. Location 317 may be a location of the talent seeker 302, e.g., a country, state, etc. Connections 318 may be connections with other members 210 of the connection network system 100 of the talent seeker 302. Job 502 may be a job 502 that was posted (e.g., post job 352) by the talent seeker 302 or may be a job 502 of the talent seeker 302.

Company 212 may be one or more companies that are associated with the talent seeker 302. For example, a company 212 that is associated with one of the jobs 502 or a company 212 that employs the talent seeker 302. The talent seeker context 320 indicates whether the talent seeker 302 is seeking a job seeker 402. Feed post 322 may be a post that the talent seeker 302 posts on the connection network system 100. The feed post 322 may include comments by the talent seeker 302, external links, images, etc. The talent seeker 302 may include indications that they are look for a job seeker 402 in the feed post 322, e.g., "I am looking out for a machine learning engineer in Hyderbad. Reach out to me."

Search history 326 may indicate a number of search performed by the talent seeker 302, e.g., a search for job seeker 304. Posting history 326 may indicate a history of posting job 502 by the talent seeker 302. Response history 328 may indicate a history of messaging and responding to messaging from job seekers 304 by the talent seeker 302. Profile quality 330 may indicate a quality (e.g., number of fields filled out, frequency of updates, etc.) for the talent seeker 302. Years of experience 332 may indicate a number of years of experience at the job 502 for the talent seeker 302. Skills 334 may indicate skills of the talent seeker 302.

The actions 350 include confirm intents 352, specify preferences 354, post job 356, and message 358. Specify preferences 354 may be an action 350 where the talent seeker 302 responds to a UI and indicates one or more preferences, e.g., a number of outreaches 306. Confirm intents 352 may be an action 350 where the talent seeker 302 responds to a UI of the confirm job module 1002 as disclosed in conjunction with FIG. 10 and herein. Post job 356 may enable the talent seeker 302 to post a job 208, e.g., post module 204 may be invoked that adds a job 208 to the connection network system 100. Message 358 may be where the job seeker 402 responds to a UI request to message with a job seeker 402, e.g., contact talent seeker module 902 as disclosed in conjunction with FIG. 9. Blocked 336 may indicate one or more job seekers 402 that are blocked from messaging the talent seeker 302. The talent seeker 302 may block a job seeker 402 via a UI. Talent seeker rating 337 may be a rating indicating how likely it is that talent seeker 302 is actually a talent seeker 302, which may be contextualized for a job 502 and job seeker 402.

Table 1 illustrates job posters in India, the USA, and globally. Job posters are talent seekers 302 who have posted a job (e.g., post job 352), in accordance with some embodiments. Row 1 illustrates the #job posters, which illustrates a number of job posters for India, USA, and globally. Row 2 illustrates the #posters with show poster true, which is the number of job posters where the job 502 that was posted (e.g., post job 352) has show poster 506 as true. Show poster 506 being true enables the job seeker 402 to view the talent seeker 502 that posted the job 502. The #job posters with show poster true (row 2) may be termed the liquidity as it enables contact between the job seeker 402 and the talent seeker 302 because the job seeker 402 will be able to see the talent seeker 302 that posted the job 502 (e.g., post job 352). Row 3 illustrates the #job posters with show true and company ID null, which indicates the number of jobs 502 where an identification (ID) 604 of the company 508 may be null for a job 502. The company 508 of the job 502 may still have a name 602. Row 4 illustrates jobs per job poster, e.g., a mean and median number of jobs 502 that are posted (e.g., post job 352) by a talent seeker 302. Row 5 illustrates job posters per company. For example, a mean and median of a number of talent seekers 302 that are associated with the same company 508. Table 1 illustrates approximate numbers.

TABLE 1

Job Seekers that Posted a Job on the Connection Network System

| Row | JOB POSTERS | INDIA | USA | GLOBAL |
| --- | --- | --- | --- | --- |
| 1 | #Job Posters | Approximately 1K-10K | Approximately 50K-100K | Approximately 50K-200K |
| 2 | #Job Posters with Show Poster True (liquidity) | Approximately 2K-4K | Approximately 50K-75K | Approximately 100K-150K |
| 3 | #Job Posters with Show Poster True and Company ID Null | Approximately 1K | Approximately 15K | Approximately 20K |
| 4 | Jobs per Job Poster | Mean of 2.0 and Median of 10 to 50 Jobs | Mean of 3.0 and Median of 10 to 6K | Mean of 3.0 and Median of 10 to 6K |
| 5 | Job Poster per Company | Mean of 1-2 and Median of 10 to 50 | Mean of 1-2 and Median of 10 to 150-200 | Mean of 1-2 and Median of 10 to 500 |

Table 2 illustrates a number of job posters. Row 1 illustrates #members, e.g., a number of members 210 of the connection network system 100. Row 2 illustrates #members that are "talent professionals." For example, a talent seeker 302 may be a talent professional 308, e.g., a hiring manager at a company or a job recruiter. Row 3 illustrates #members that are "recruiters." For example, the talent seeker 302 may be a professional recruiter 310 such as a person that identifies people for a job offered by a company 508 that they do not work for. The numbers in Table 2 are approximate.

TABLE 2

| Row | People Looking for Talent | India | USA | Global |
| --- | --- | --- | --- | --- |
| 1 | # members | | | 500,000,000-2,000,000,000 |
| 2 | # members that are "talent professionals" | | | 5,000,000-10,000,000 |
| 3 | # members are "recruiters" | | | 1,000,000-5,000,000 |

Figure 4:
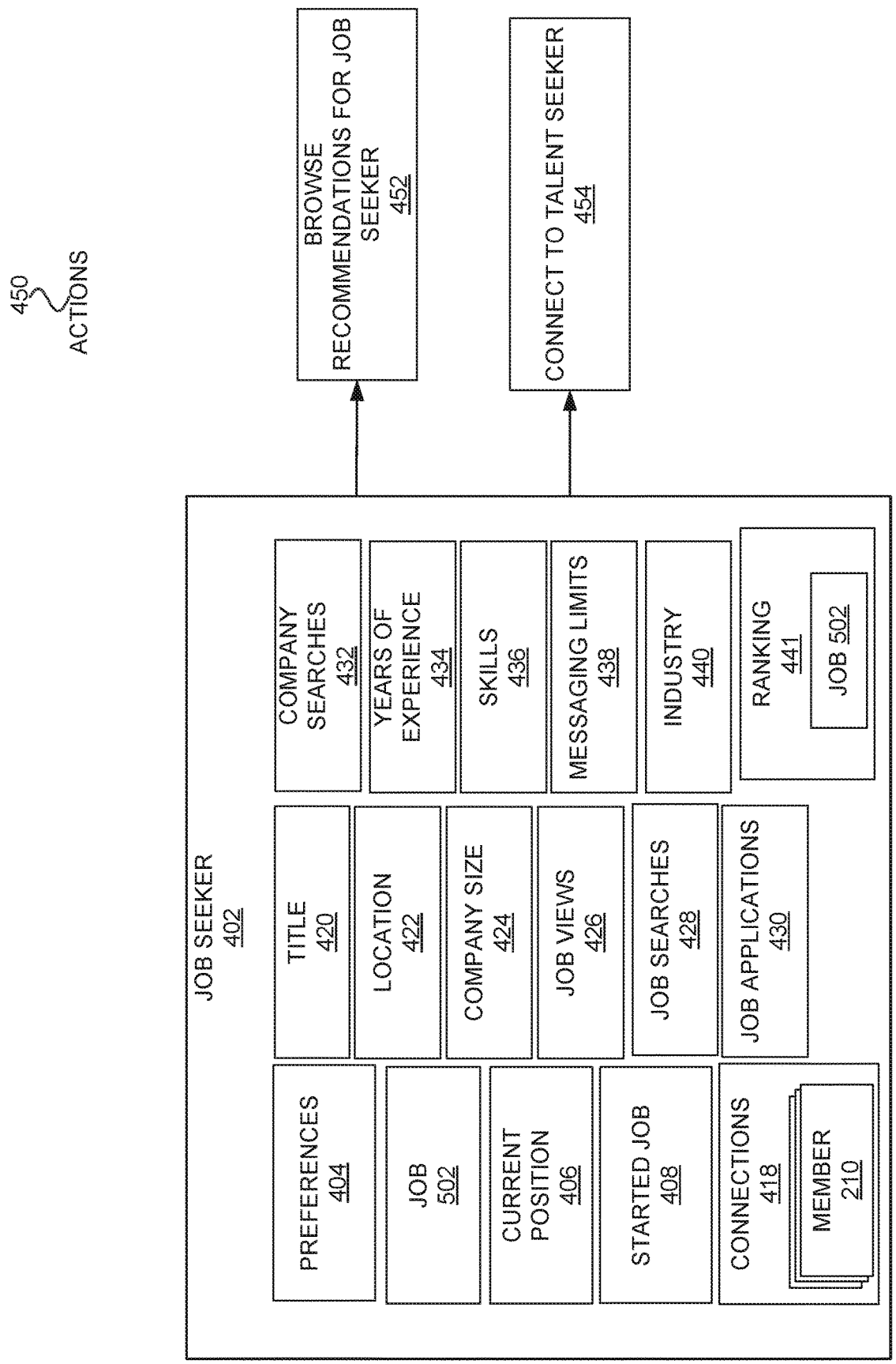
FIG. 4 illustrates a job seeker and actions, in accordance with some embodiments.

FIG. 4 illustrates a job seeker 402 and actions 450, in accordance with some embodiments. Illustrated in FIG. 4 is job seeker 402 and actions 450. Job seeker 402 may include preferences 404, current position 406, started job 408, job 502, connections 418, member 210, title 420, location 422, company size 424, job views 426, job searches 428, job applications 430, company searches 432, years of experience 434, skills 436, messaging limits 438, industry 440, and ranking 441.

Preferences 404 may be preferences of the job seeker 402, e.g., whether the job seeker 402 wants to see talent seeker 302 recommendations, a preferred location for a job 502, etc. Preferences 404 may include preference the job seeker 402 would like for a job 502, e.g., any of the fields of the job seeker 402 that are applicable to a job 502, e.g., location 422, company size 424, etc. Current position 406 may indicate a current position of the job seeker 402, e.g., software engineer, marketing professional, etc. Started job 408 may indicate whether the job seeker 402 has started a job 502. Connections 418 may indicate connections 418 with other members 210 of the connection network system 100. Location 422 indicates a location of the job seeker 402.

Title 420 may be a title of job 502. Location 422 may be a location of the job seeker 402 or a job 502 of the job seeker 402. Company size 424 may be a company size of a job 502 of the job seeker 402. Job views 426 may indicate a number of jobs 502 the job seeker 402 has viewed within a specified time period. Job searches 428 may indicate a number of job searches the job seeker 402 has performed within a specified time period. Job applications 430 may indicate a number of job applications the job seeker 402 has filled out within the connection network system 100. Company searches 432 may indicate a number of searches for companies the job seeker 502 has performed within a specified time period. Years of experience 434 may indicate a number of years of experience the job seeker 402 that are relevant to the job 502. Skills 436 may indicate one or more skills of the job seeker 402. Messaging limits 438 may indicate limits on messaging to talent seekers 302 of the job seeker 402, e.g., a basic membership to the connection network system 100 may have a lower messaging limit 438 than a premium membership. Industry 440 may indicate an industry the job seeker 402 is currently employed with and/or an industry the job seeker 402 is searching for a job 208, e.g., industry 440 may be software industry, hotel and entertainment, advertising, etc.

Actions 450 may include browse recommendations for job seeker 452 and connect to talent seeker 454. Browse recommendations for seeker 452 may include browsing the UI screen 702 or browsing recommendation for job 224. Some embodiments may encourage members to 210 to upgrade to a premium membership so that they can use the action 450 connect to talent seeker 454. Ranking 441 indicates a ranking for the job seeker 402 compared with other job seekers 402 for the job 502. In some embodiments, identify talent seeker module 216 is configured to rank the job seeker 402 for a job 502 by comparing the job seeker 402 with other job seekers 402 that have expressed an interest in the job 502. For example, by comparing the skills 436, years of experience 434, title 402, current position 406, etc., of a job seeker 402 with other job seekers 402. In some embodiments, ranking 441 may indicate whether the job seeker 402 is minimally qualified for the job 502. For example, identify talent seeker module 216 compares the skills 426, years of experience 434, etc., of the job seeker 402 with the skills 536, years of experience 534, etc., indicated as required or desired for the job 502.

Figure 5:
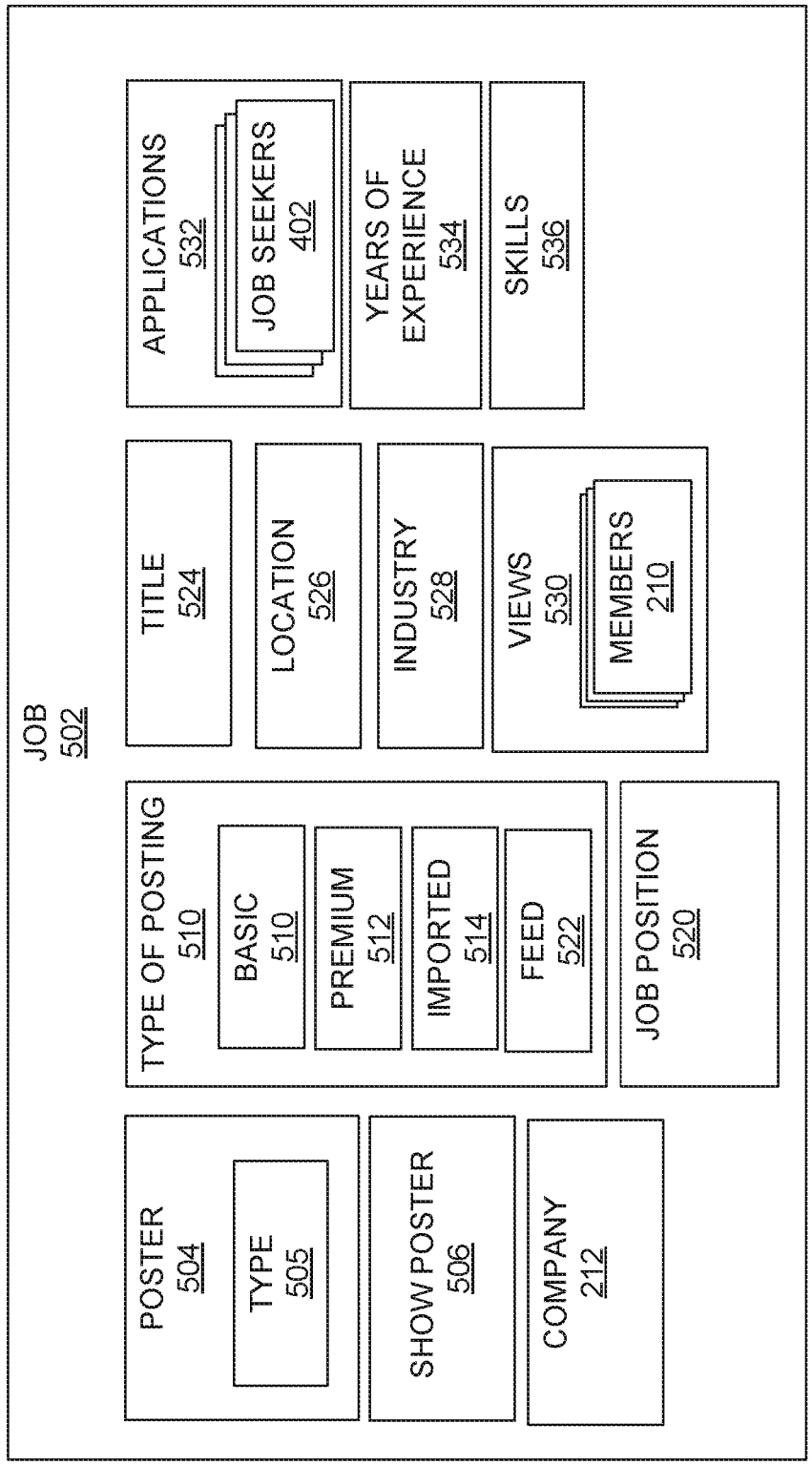
FIG. 5 illustrates jobs, in accordance with some embodiments.

FIG. 5 illustrates jobs 502, in accordance with some embodiments. Jobs 502 may include poster 504, show poster 506, company 508, type of posting 510, and job position 520, title 524, location 526, industry 528, views 530, applications 532, years of experience 534, and skills 536. Company 212 may be a company as disclosed herein, e.g., FIG. 6. The job position 520 may indicate a type of position of the job 502. Type of posting 510 may indicate an origin of the job 502 within the connection network system 100. Type of posting 510 may be basic 510, premium 512, imported 514, and feed 522. Basic 510 indicates that the job seeker 502 that posted the job 502 had a basic membership. Premium 512 indicates that the job seeker 502 that posted the job 502 had a premium membership. Imported 514 indicates that the job 502 was imported from outside the connection network system. Feed 522 indicates the job 502 was created based on a feed post 322 of a talent seeker 302, e.g., feeds module 206 may have generated the job 502.

Job position 520 indicates a job position for the job 502. Title 524 indicates a title for the job 502. Location 526 indicates a location for the job 502. Industry 528 indicates an industry for the job 502. Views 530 indicates a number of members 210 that have viewed the job 502. Applications 532 indicates a number of applications 532 that have been submitted for the job 502. Years of experience 534 indicates a number of years of experience that required or recommended for the job 502. Skills 536 indicates one or more skills that are required or recommended for the job 502, e.g., programming, software application knowledge, etc.

TABLE 3

| | | Jobs | | |
|---|---|---|---|---|
| ROWS | JOBS | INDIA | USA | GLOBAL |
| 1 | #Jobs | 100K-600K | 5,000,000-15,000,000 | 10,000,000-30,000,000 |
| 2 | #Jobs Basic | 300K-1,000,000 | 800K-2,000,000 | 15,000,000-30,000,000 |
| 3 | #Jobs Premium | 10K-500K | 400K-1,000,000 | 800K-2,000,000 |
| 4 | #Jobs where Show Poster (e.g., 506) is True | 5K-50K | 100K-300K | 200K-500K |
| 5 | #Jobs where Show Poster (e.g., 506) is True and Company (e.g., 508) ID is Null | 1K-10K | 10K-30K | 20K-40K |
| 6 | #Jobs Basic and company (e.g., 508) ID is not Null | 200K-400K | 3,000,000-5,000,000 | 7,000,000-10,000,000 |
| 7 | Jobs per company | Mean of 2-3 and Median of 10 to 150 | Mean of 4-6 and Median of 20 to 6K | Mean of 4-6 Median of 20 to 6K |

Table 3 illustrates numbers regarding jobs 502. Row 1 illustrates a number of jobs 502 for India, USA, and globally. Row 2 illustrates #jobs basic, e.g., jobs 502 that were posted with a type of posting 510 as basic 510. Row 3 illustrates #jobs premium, e.g., jobs 502 that were posted with a type of posting 510 as premium 512. Row 4 illustrates #jobs where show poster is true, e.g., jobs 502 with show poster 506 being true. Row 4 illustrates the liquidity of the number of talent seekers 302 that may be available for job seekers 402 to contact. Row 5 illustrates #jobs where show poster is true and company ID is null. For example, jobs 502 with show poster 506 as true and ID 604 of a company 508 of a job 502 is NULL. Row 6 illustrates #jobs basic and an ID 604 of a company 508 of a job 502 is not null, e.g., job 502 (FIG. 5) where ID 604 of company 508 indicates an ID of company 508 within the connection network system 100. Row 7 illustrates a number of jobs per company, e.g., a mean and median.

FIG. 6 illustrates a company 212, in accordance with some embodiments. The company 212 may include job 502, talent seeker 302, name 602, ID 604, location 606, industry 608, and company size 610. The job 502 may be one or more jobs 502 associated with the company 212. Talent seeker 302 may be one or more talent seekers 302 associated with the company 212. Name 602 may be a name of the company 508. The ID 604 may be an ID of the company 212 within the connection network system 100. Location 606 may be one or more locations of the company 212. Industry 608 may be one or more industries of the company 212. Company size 610 may be a size of the company, e.g., number of employee, gross revenue, etc.

Figure 7:
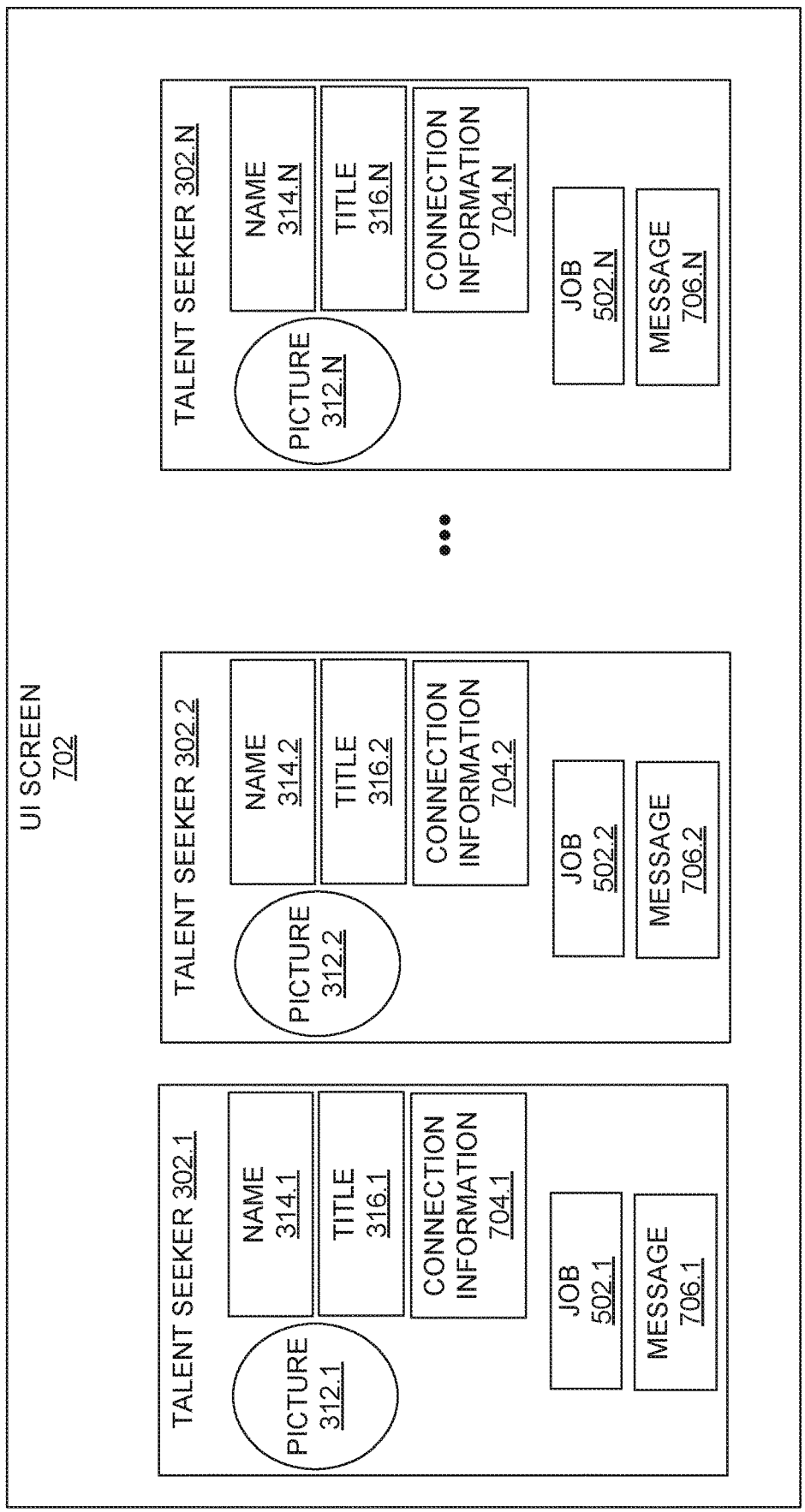
FIG. 7 illustrates a user interface (UI), in accordance with some embodiments.

FIG. 7 illustrates a user interface (UI) 702, in accordance with some embodiments. Illustrated in FIG. 7 is talent seeker 302, picture 312, name 314, title 316, connection information 704, job 502, and message 706. UI screen 702 includes talent seeker 302.1 through talent seeker 302.N. In some embodiments, N may be 1 or greater. The picture 312 may be the same or similar as picture 312 (FIG. 3), name 314 may be the same or similar as name 314 of FIG. 3, title 316 may be the same or similar as title 316 of FIG. 3, and job 502 may be the same or similar as job 502 of FIG. 5. The UI screen 702 may be displayed to a job seeker 402. The connection information 704 may indicate the connection between the job seeker 402 and the talent seeker 302 based on connections 318 and connections 418. The talent seeker 302 may be associated with the job 502, e.g., talent professional 308 or recruiter 310. Example connections may be that the job seeker 402 and talent seeker 302 are connected with one another, that the job seeker 402 and talent seeker 302 both are connected to a common member 210, etc. Message 706 may be a way for the job seeker 402 to message the talent seeker 302, e.g., to perform action 450 connect to talent seeker 454.

Figure 8:
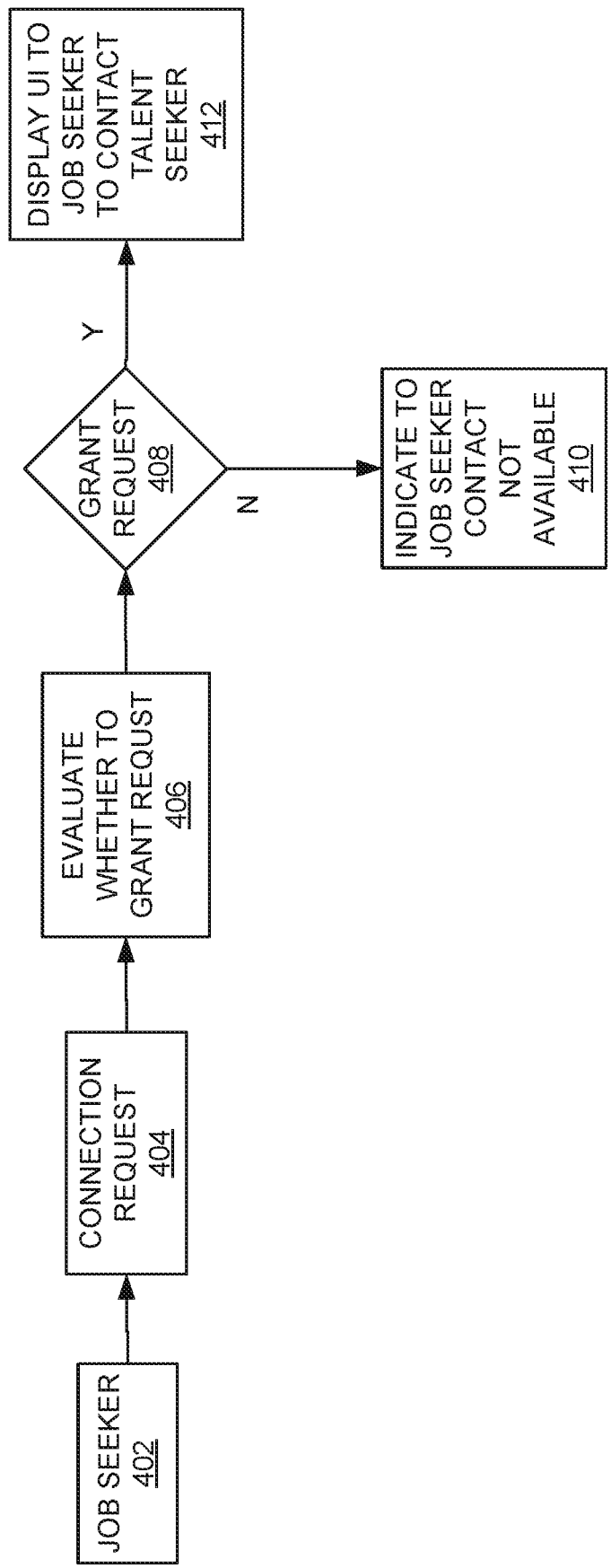
FIG. 8 illustrates a method 800 for messaging a talent seeker, in accordance with some embodiments.

FIG. 8 illustrates a method 800 for messaging a talent seeker 302, in accordance with some embodiments. The method 800 begins at operation 404 with a job seeker 402 making a connection request 404 to a talent seeker 302. For example, the job seeker 402 may select message 706.1 of UI screen 702 to message talent seeker 302.1. The method 800 continues at operation 406 with evaluating whether to grant the request 406. For example, the preferences 304 of the talent seeker 302 may be considered. For example, if a number of outreaches 306 has been reached, then the request may be denied. In another example, if a messaging limit 438 of the job seeker 402 has been exceed, then the request is denied. If the evaluation is to not grant the request, then the method 800 continues at operation 410 with indicate to job seeker contact not available 410. For example, on UI screen 702, in response to the job seeker 402 pressing message 706.1, the UI screen 702 may display talent seeker 302.1 is not available. If the evaluation is to grant the request, then the method 800 continues at operation 412 with displaying a UI to job seeker 402 to contact talent seeker 302. For example, contact talent seeker module 902 may display a prefilled template 904 to the job seeker 402 and provide a UI for the talent seeker 302 to respond. Method 800 may include one or more additional operations. One or more of the operations of method 800 may be optional. Method 800 may include one or more additional operations.

Figure 9:
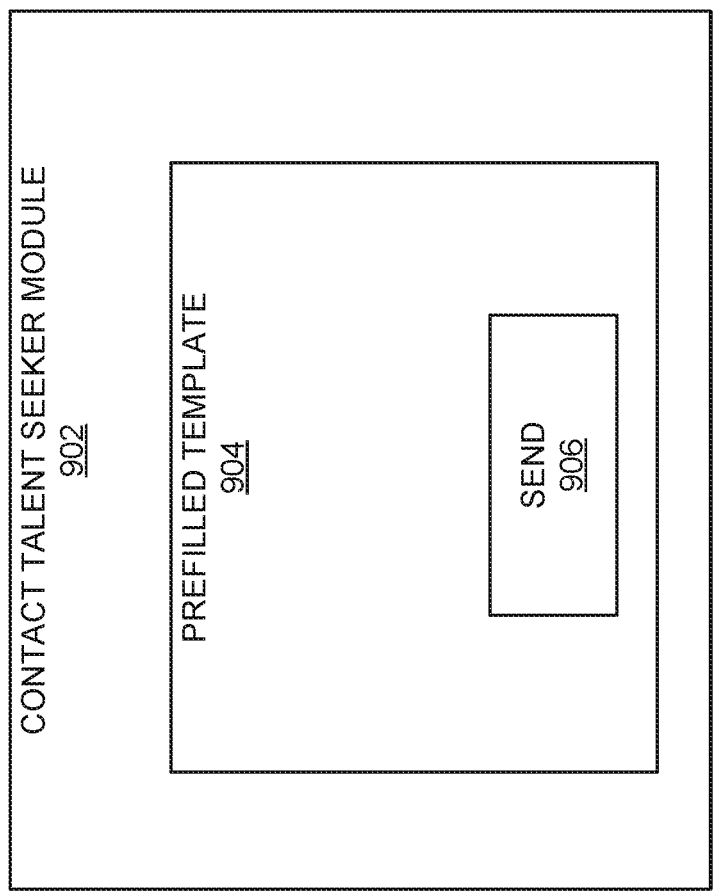
FIG. 9 illustrates contact talent seeker module, in accordance with some embodiments.

FIG. 9 illustrates contact talent seeker module 902, in accordance with some embodiments. Illustrated in FIG. 9 is contact talent seeker module 902, prefilled template 904, and send 906. Contact talent seeker module 902 may determine whether to grant a request 408 by a job seeker 402 to contact a talent seeker 303 or may be invoked after it is determined to grant a request by the job seeker 402 to contact the talent seeker 302. A prefilled template 904 may be provided to the job seeker 402 that include information from one or more of talent seeker 302, job seeker 402, job 502, and company 212. For example, "Dear Ms. Smith, I am interested in the position of software engineer at Company X. I have programming skills and eight years of experience." The job seeker 402 may fill in additional information for the prefilled template 904. The job seeker 402 may send the message, e.g., prefilled template 904, to the talent seeker 302 by pressing send 906. Talent seeker module 902 may be invoked by the job seeker 402 when prosing recommendations for job seeker 220 or recommendations for job 224, in accordance with some embodiments.

Figure 10:
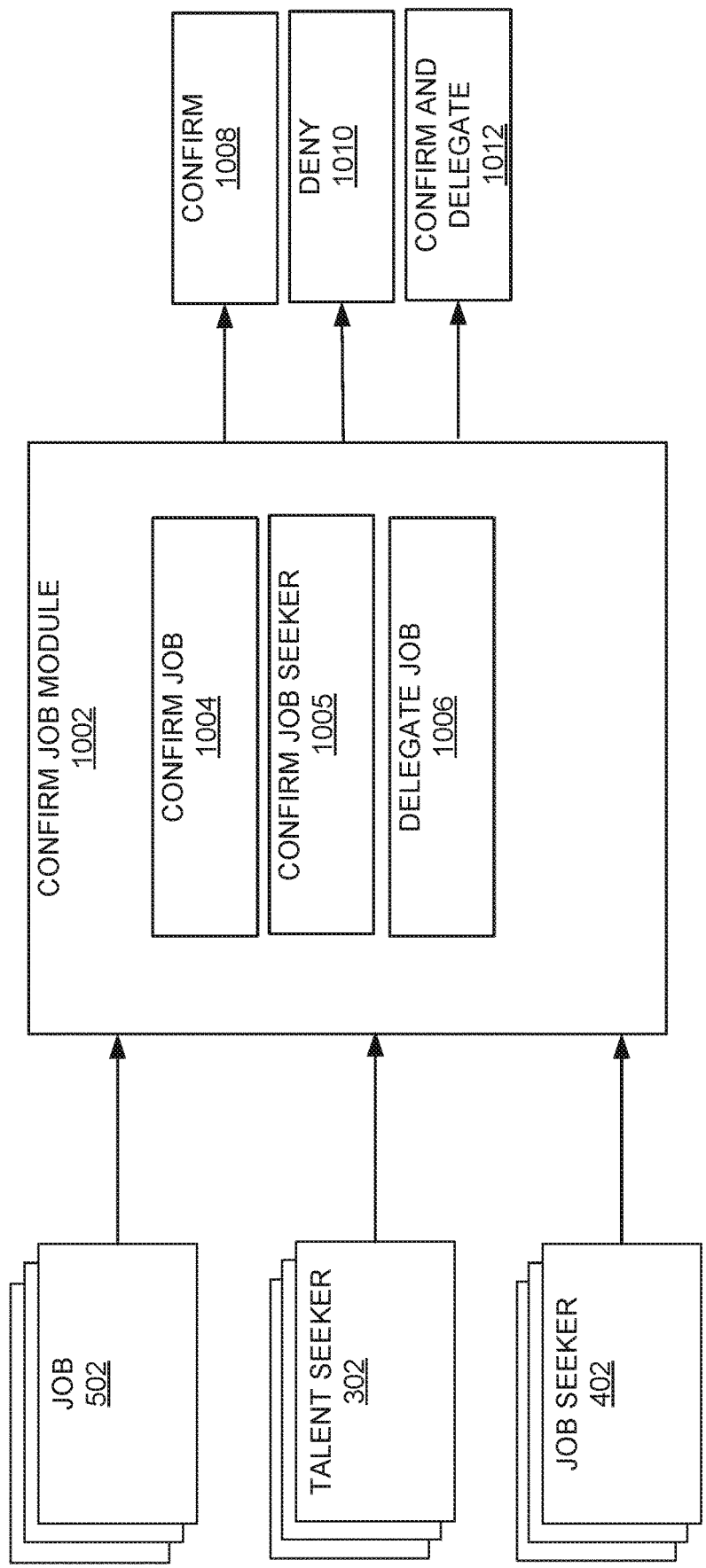
FIG. 10 illustrates a system for confirming a job with a talent seeker, in accordance with some embodiments.

FIG. 10 illustrates a system for confirming a job 502 with a talent seeker 302, in accordance with some embodiments. Illustrated in FIG. 10 is job 502, confirm job module 1002, confirm 1008, deny 1010, and confirm and delegate 1012. The confirm job module 1002 may include confirm job 1004 and delegate job 1006. The confirm job module 1002 takes one or more of a job 502 talent seeker 302, job seeker 402, e.g., ones that are selected by identify talent seeker module 216 and presents a talent seeker 302 with an interface to confirm 1008 or deny 1010 that the talent seeker 302 is associated with the job 502 and/or job seeker 402. Confirm job module 1002 may include confirm job 1004, confirm job seeker 1005, and delegate job 1006. Confirm job 1004 may take a job 502 and talent seeker 302 and present a UI to the talent seeker 302 to select confirm 1008 or deny 1010 that the talent seeker 302 is seeking a job seeker 402 for the job 502. Confirm job seeker 1005 may take a talent seeker 302 and a job seeker 402 and present a UI to the talent seeker 302 to confirm 1008 or deny 1010 that the job seeker 402 is someone the talent seeker 302 may be interested in hiring. Confirm job seeker 1005 may look at aspects of the job seeker 402 and the talent seeker 302 to determine whether to present the UI to the talent seeker 302. Confirm job seeker 1005 may select a field of the job seeker 402 to present to the talent seeker 302 to confirm 1008 or deny 1010 that the talent seeker 302 is interested in a job seeker 1005, e.g., a current position 406 of the job seeker 402. For example, "Are you interested in job seekers with the title senior software development engineer?"

Confirm job module 1002 may present the UI to the talent seeker 302 in particular contexts. For example, confirm job module 1002 may present the UI to the talent seeker 302 when the talent seeker 302 is searching for job seekers 402 on the social connection network 100.

In some embodiments, confirm job module 1002 may confirm that jobs 502 with type of posting 510 of feed 522 are actually jobs 502. For example, a prompt may be presented to the job seeker 402 (e.g., the member 210 that had the feed post 322 that feeds module 206 determined included a job 502) that confirms the job 502 is an actual job 502 and that the job seeker 402 would like the job 502 to be available as a job 502 in the connection network system 100. In some embodiments, confirm job module 1002 (or feeds module 206) may determine the company 212 associated with the job 502 with type of posting 510 as feed 522 and confirm with another person of the company 212 that is indicated as an authority of the company 212, e.g., a talent seeker 302 that is indicated as a talent professional 308. Confirm job module 1002 may determine if the job seeker 402 wants to confirm and delegate 1012 the handling of the job 502 to another talent seeker 302. Confirm job module 226 may be the same or similar as confirm job module 1002.

Figure 11:
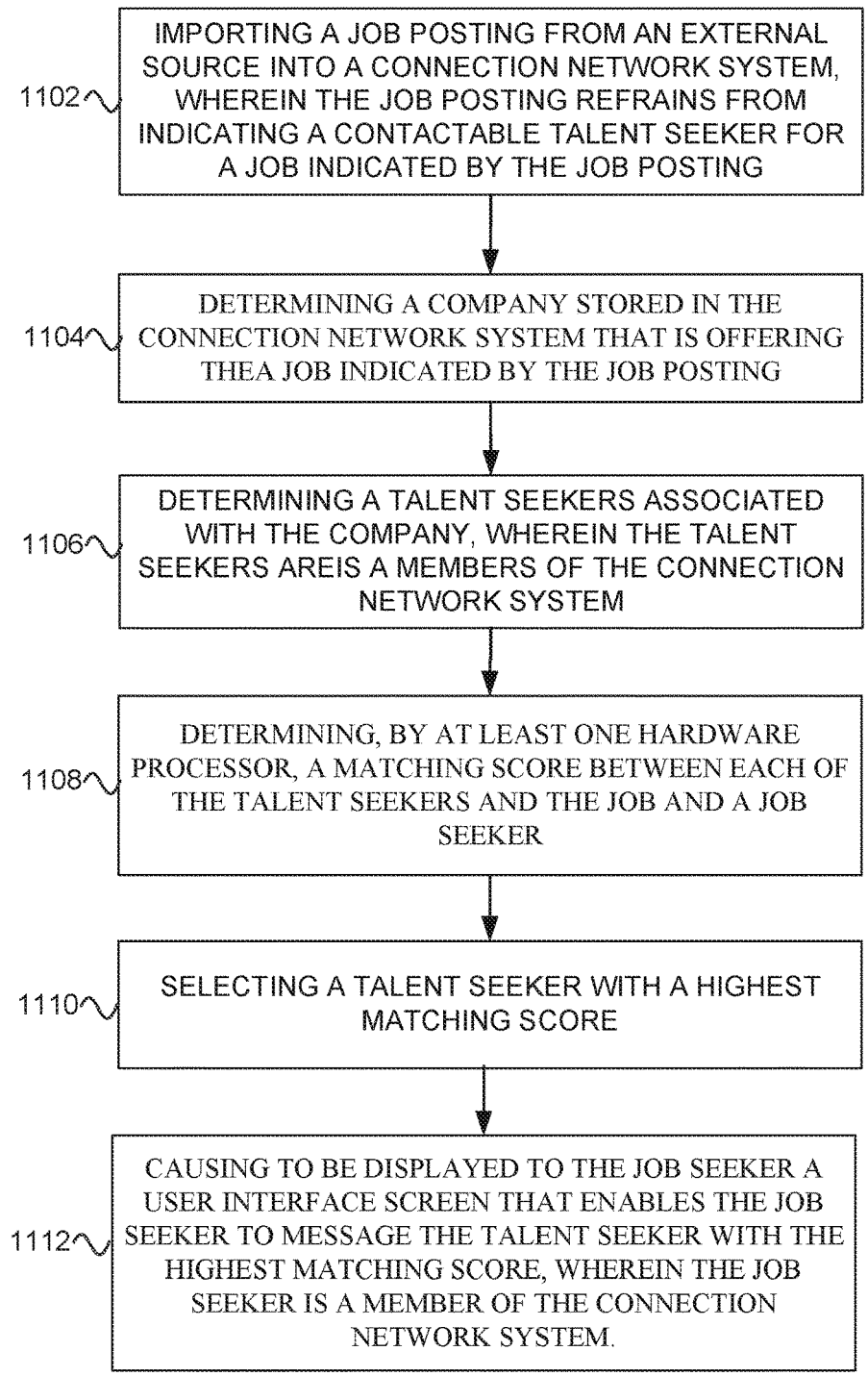
FIG. 11 illustrates a method for connecting talent seekers with job seekers, in accordance with some embodiments.

FIG. 11 illustrates a method 1100 for connecting talent seekers with job seekers, in accordance with some embodiments. The method 1100 may begin at operation 1102 with importing, by at least one hardware processor, a job posting from an external source into a connection network system, where the job posting refrains from indicating a contactable talent seeker for a job indicated by the job posting. For example, import jobs module 202 may import jobs 208.1 as disclosed in conjunction with FIG. 2 and herein. One or more of the processors 1202 (FIG. 12) may implement the operations of method 1100, where the operations may be implemented with instructions 1224.

The method 1100 may continue at operation 1104 with determining a company stored in the connection network system that is offering the job. For example, identify talent seeker module 216 may identify a job 502 that is associated with the job 208.1 as disclosed in conjunction with FIG. 2 and herein.

The method 1100 may continue at operation 1106 with determining talent seekers associated with the company, where the talent seekers are members of the connection network system. For example, identify talent seeker module 216 may determine talent seeker 302 of recommendation for job 224 as disclosed in conjunction with FIG. 2 and here.

The method 1100 may continue at operation 1108 with determining a matching score between each of the talent seekers and the job and a job seeker. For example, identify talent seeker module 216 may determine matching scores 222 as described herein.

The method 1100 may continue at operation 1110 with selecting a talent seeker with a highest matching score. For example, identify talent seeker module 216 may select the talent seekers 302 of recommendation for job 224 based on the talent seeker 302 or talent seekers 302 with the highest matching score 222. Additionally, identify talent seeker module 216 may select the talent seekers 302 of UI screen 702 based on the matching scores 222.

The method 1100 may continue at operation 1112 with causing to be displayed to the job seeker a user interface screen that enables the job seeker to message the talent seeker with the highest matching score, where the job seeker is a member of the connection network system. For example, identify talent seeker module 216 may cause to be displayed UI screen 702.

Operations of method 1100 may be performed in a different order. One or more of the operations of method 1100 may be optional. Method 1100 may include one or more additional operations.

Figure 12:
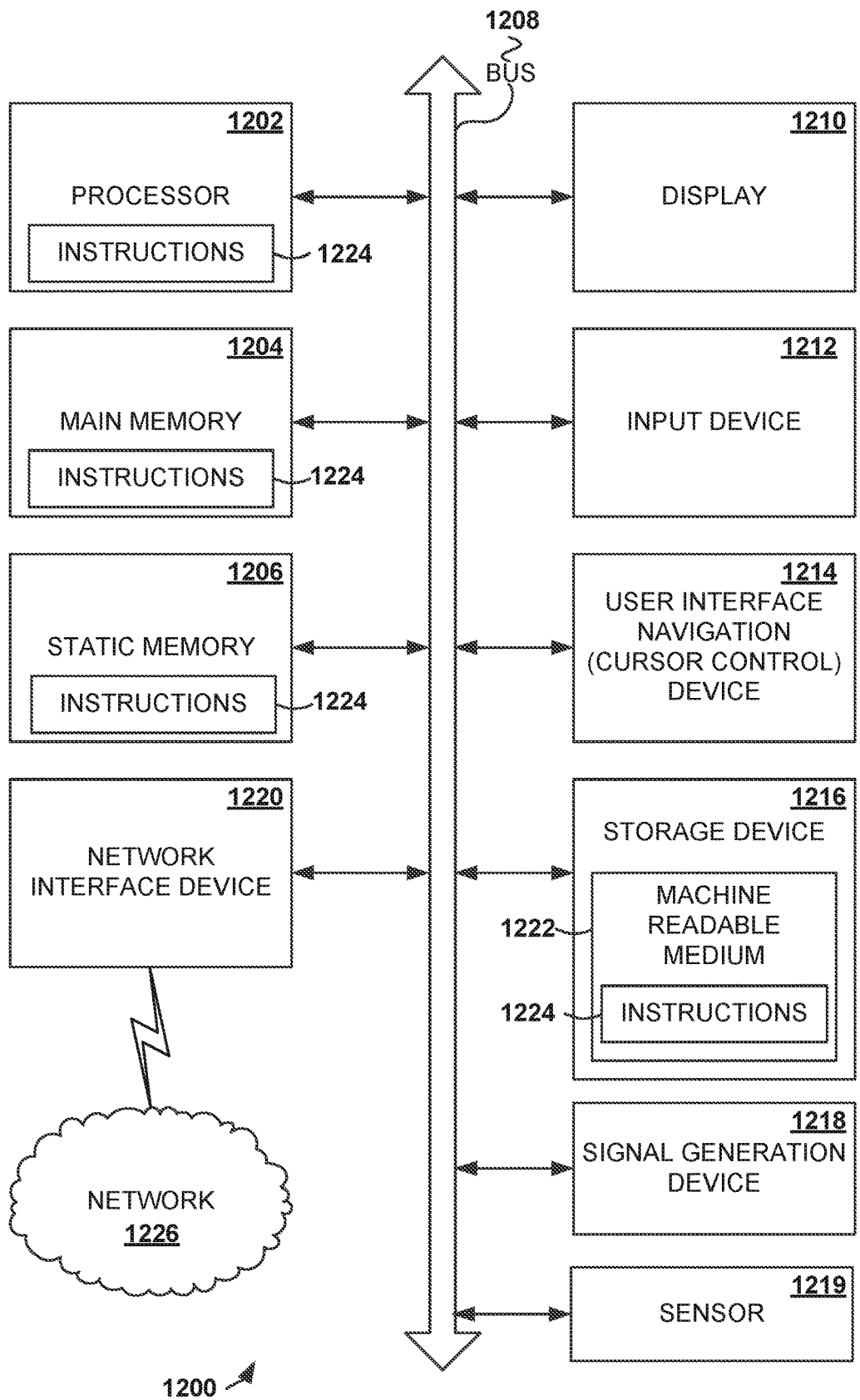
FIG. 12 shows a diagrammatic representation of the machine in the example form of a computer system and within which instructions (e.g., software) for causing the machine to perform any one or more of the methodologies discussed herein may be executed.

FIG. 12 shows a diagrammatic representation of the machine 1200 in the example form of a computer system and within which instructions 1224 (e.g., software) for causing the machine 1200 to perform any one or more of the methodologies discussed herein may be executed. In alternative embodiments, the machine 1200 operates as a standalone device or may, be connected (e.g., networked) to other machines. In a networked deployment, the machine 1200 may operate in the capacity of a server machine or a client machine in a server-client network environment, or as a peer machine in a peer-to-peer (or distributed) network environment. The machine 1200 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1224, sequentially or otherwise, that specify actions to be taken by that machine. Further, while only a single machine is illustrated, the term "machine" shall also be taken to include a collection of machines that individually or jointly execute the instructions 1224 to perform any one or more of the methodologies discussed herein in conjunction with FIGS. 1-11.

The machine 1200 includes a processor 1202 (e.g., a central processing unit (CPU), a graphics processing unit (GPU), a digital signal processor (DSP), an application specific integrated circuit (ASIC), a radio-frequency integrated circuit (RTIC), or any suitable combination thereof), a main memory 1204, and a static memory 1206, which are configured to communicate with each other via a bus 1208. The machine 1200 may further include a graphics display 1210 (e.g., a plasma display panel (PDP), a light emitting diode (LED) display, a liquid crystal display (LCD), a projector, or a cathode ray tube (CRT)). The machine 1200 may also include an alphanumeric input device 1212 (e.g., a keyboard), a user interface navigation (cursor control) device 1214 (e.g., a mouse, a touchpad, a trackball, a joystick, a motion sensor, or other pointing instrument), a storage device 1216, a signal generation device 1218 (e.g., a speaker), a network interface device 1220, sensor 1219. Sensor 1219 may be a camera, a light sensor, sound sensor, etc.

The storage device 1216 includes a machine-readable medium 1222 on which is stored the instructions 1224 (e.g., software) embodying any one or more of the methodologies or functions described herein. The instructions 1224 may also reside, completely or at least partially, within the main memory 1204, within the processor 1202 (e.g., within the processor's cache memory), or both, during execution thereof by the machine 1200. Accordingly, the main memory 1204 and the processor 1202 may be considered as machine-readable media. The instructions 1224 may be transmitted or received over a network 1226 via the network interface device 1220.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1222 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 1200), such that the instructions, when executed by one or more processors of the machine (e.g., processor 1202), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A computer-implemented method comprising:
    storing a plurality of job announcement data structures in a connection network system in accordance with a plurality of job announcement postings, the plurality of job announcement postings generated within the connection network system by members of the connection network system;
    importing, by at least one hardware processor, a job announcement posting from an external site to the connection network system, wherein the job announcement posting refrains from indicating a contactable talent seeker for a job indicated by the job announcement posting;
    creating a job announcement data structure for the job announcement posting within the connection network system;
    filling, by at least one hardware processor, fields of the job announcement data structure with fields from the imported job announcement posting;
    determining, by at least one hardware processor, first matching scores for companies stored in the connection network system, wherein the first matching scores are determined based on comparing company data structures of the companies with the job announcement data structure of the imported job announcement, wherein the comparing comprises comparing at least one of:
    names of the companies stored in the connection network system with a name indicated in the job announcement posting, locations of the companies stored in the connection network system with a location indicated in the job announcement posting, sizes of the companies with a size of a company indicated in the job announcement posting, or industries of the companies with an industry of the company indicated in the job announcement posting;
    selecting a company from the companies based on the first matching scores;
    filling a company field of the job announcement data structure with an identification of the selected company within the connection network system;
    determining, by at least one hardware processor, talent seekers associated with the company, wherein the talent seekers are members of the connection network system;
    determining, by at least one hardware processor, second matching scores for the talent seekers based on comparing members the talent seekers are connected with to members a job seeker is connected with, wherein the second matching scores are further based on comparing each of the talent seekers both with the job indicated by the job announcement posting and with the job seeker;
    selecting a talent seeker of the talent seekers with a highest second matching score; and
    causing, by at least one hardware processor, to be displayed to the job seeker a user interface screen that enables the job seeker to message the talent seeker with the highest second matching score, wherein the job seeker is a member of the connection network system.

2. The computer-implemented method of claim 1, wherein determining the second matching scores for the talent seekers further comprises:
    determining the second matching scores for the talent seekers based on one or more of: comparing locations of the talent seekers with a location of the job seeker, comparing industries of the talent seekers with an industry of the job seeker, or comparing search histories of the talent seekers with skills and years of experience of the job seeker.

3. The computer-implemented method of claim 1, wherein the computer-implemented method further comprises:
    selecting the company based on the company having a first highest matching score or a second highest matching score of the first matching scores for the companies stored in the connection network system.

4. The computer-implemented method of claim 1, wherein determining the second matching scores for the talent seekers further comprises:
    determining the second matching scores for the talent seekers associated with the company, wherein the second matching scores are based on one or more of: comparing locations of the talent seekers with a location of the job seeker, comparing connections of the talent seekers with other members of the connection network system with connections of the job seeker with other members of the connection network system, comparing industries of the talent seekers with an industry of the job seeker, comparing search histories of the talent seekers with skills and years of experience of the job seeker, or comparing companies of the talent seekers with the company.

5. The computer-implemented method of claim 4, further comprising:
    selecting the talent seekers based on the talent seekers having higher second matching scores than other talent seekers.

6. The computer-implemented method of claim 1, wherein the talent seekers are talent professionals employed by the company or recruiters that are not employed by the company.

7. The computer-implemented method of claim 1, further comprising:
causing, by at least one hardware processor, to be displayed to each talent seeker of the talent seekers another user interface that provides a first option for a corresponding talent seeker to confirm the corresponding talent seeker is seeking job seekers for the job indicated by the job announcement posting and a second option for the corresponding talent seeker to deny the talent seeker is seeking job seekers for the job.

8. The computer-implemented method of claim 7, wherein a third option is displayed for the corresponding talent seeker to indicate another member of the connection network system is administrating a search for job seekers for the job indicated by the job announcement posting.

9. The computer-implemented method of claim 1, further comprising:
determining, by at least one hardware processor, a second talent seeker for the job seeker; and
causing, by at least one hardware processor, to be displayed to the job seeker another user interface screen that enables the job seeker to message the second talent seeker.

10. The computer-implemented method of claim 9, wherein the talent seekers are first talent seekers, and wherein determining the second talent seeker for the job seeker further comprises:
determining third matching scores for the talent seekers, wherein the third matching scores are based on one or more of: comparing a company of the job indicated by the job announcement posting with a company of the second talent seeker, comparing a location of the job with a location of the second talent seeker, comparing a number of applications for the job with a threshold, comparing locations of the talent seekers with a location of the job seeker, comparing connections of the talent seekers with other members of the connection network system with connections of the job seeker with other members of the connection network system, comparing industries of the talent seekers with an industry of the job seeker, or comparing search histories of the talent seekers with skills and years of experience of the job seeker.

11. The computer-implemented method of claim 10, wherein the highest second matching score is a first highest second matching score and wherein the computer-implemented method further comprises:
selecting the second talent seeker based on the second talent seeker having a second highest second matching score of the second matching scores for the talent seekers; and
causing, by at least one hardware processor, to be displayed to the job seeker a second user interface screen that enables the job seeker to message the second talent seeker.

12. The computer-implemented method of claim 11, further comprising:
receiving, by at least one hardware processor, a connection request from the job seeker to message the second talent seeker; and
if a number of outreaches of the second talent seeker is below a threshold and a number of messages of the job seeker is below a messaging limit, cause to be displayed to the job seeker a third user interface screen that connects the job seeker with the second talent seeker.

13. The computer-implemented method of claim 1, further comprising:
determining, by at least one hardware processor, that a second job is being offered by a member of the connection network system based on a post by the member in a feed of the member; and
determining, by at least one hardware processor, a second company stored in the connection network system that is announcing the second job.

14. A non-transitory machine-readable medium storing computer-executable instructions stored thereon that, when executed by at least one hardware processor, cause the at least one hardware processor to perform a plurality of operations, the operations comprising:
storing a plurality of job announcement data structures in a connection network system in accordance with a plurality of job announcement postings, the plurality of job announcement postings generated within the connection network system by members of the connection network system;
importing, by at least one hardware processor, a job announcement posting from an external site to the connection network system, wherein the job announcement posting refrains from indicating a contactable talent seeker for a job indicated by the job announcement posting;
creating a job announcement data structure for the job announcement posting within the connection network system;
filling, by at least one hardware processor, fields of the job announcement data structure with fields from the imported job announcement posting;
determining, by at least one hardware processor, first matching scores for companies stored in the connection network system, wherein the first matching scores are determined based on comparing company data structures of the companies with the job announcement data structure of the imported job announcement, wherein the comparing comprises comparing at least one of: names of the companies stored in the connection network system with a name indicated in the job announcement posting, locations of the companies stored in the connection network system with a location indicated in the job announcement posting, sizes of the companies with a size of a company indicated in the job announcement posting, or industries of the companies with an industry of the company indicated in the job announcement posting;
selecting a company from the companies based on the first matching scores;
filling a company field of the job announcement data structure with an identification of the selected company within the connection network system;
determining, by at least one hardware processor, talent seekers associated with the company, wherein the talent seekers are members of the connection network system;
determining, by at least one hardware processor, second matching scores for the talent seekers based on comparing members the talent seekers are connected with to members a job seeker is connected with, wherein the second matching scores are further based on comparing each of the talent seekers both with the job indicated by the job announcement posting and with the job seeker;

selecting a talent seeker of the talent seekers with a highest second matching score; and causing, by at least one hardware processor, to be displayed to the job seeker a user interface screen that enables the job seeker to message the talent seeker with the highest second matching score, wherein the job seeker is a member of the connection network system.

15. The machine-readable medium of claim 14, wherein determining the second matching scores for the talent seekers further comprises:

determining the second matching scores for the talent seekers based on one or more of: comparing locations of the talent seekers with a location of the job seeker, comparing industries of the talent seekers with an industry of the job seeker, or comparing search histories of the talent seekers with skills and years of experience of the job seeker.

16. A system comprising:

a first machine-readable medium configured to store computer-executable instructions, and a second machine-readable medium configured to store talent seeker and job seeker connections and activity data; and at least one hardware processor communicatively coupled to the first machine-readable medium and the second machine-readable medium that, when the computer-executable instructions are executed, the at least one hardware processor is configured to:

storing a plurality of job announcement data structures in a connection network system in accordance with a plurality of job announcement postings, the plurality of job announcement postings generated within the connection network system by members of the connection network system;

importing, by at least one hardware processor, a job announcement posting from an external site to the connection network system, wherein the job announcement posting refrains from indicating a contactable talent seeker for a job indicated by the job announcement posting;

creating a job announcement data structure for the job announcement posting within the connection network system;

filling, by at least one hardware processor, fields of the job announcement data structure with fields from the imported job announcement posting;

determining, by at least one hardware processor, first matching scores for companies stored in the connection network system, wherein the first matching scores are determined based on comparing company data structures of the companies with the job announcement data structure of the imported job announcement, wherein the comparing comprises comparing at least one of:

names of the companies stored in the connection network system with a name indicated in the job announcement posting, locations of the companies stored in the connection network system with a location indicated in the job announcement posting, sizes of the companies with a size of a company indicated in the job announcement posting, or industries of the companies with an industry of the company indicated in the job announcement posting;

selecting a company from the companies based on the first matching scores;

filling a company field of the job announcement data structure with an identification of the selected company within the connection network system;

determining, by at least one hardware processor, talent seekers associated with the company, wherein the talent seekers are members of the connection network system;

determining, by at least one hardware processor, second matching scores for the talent seekers based on comparing members the talent seekers are connected with to members a job seeker is connected with, wherein the second matching scores are further based on comparing each of the talent seekers both with the job indicated by the job announcement posting and with the job seeker;

selecting a talent seeker of the talent seekers with a highest second matching score; and causing, by at least one hardware processor, to be displayed to the job seeker a user interface screen that enables the job seeker to message the talent seeker with the highest second matching score, wherein the job seeker is a member of the connection network system.

17. The system of claim 16, wherein determining the second matching scores for the talent seekers further comprises:

determining the second matching scores for the talent seekers based on one or more of: comparing locations of the talent seekers with a location of the job seeker, comparing industries of the talent seekers with an industry of the job seeker, or comparing search histories of the talent seekers with skills and years of experience of the job seeker.

\* \* \* \* \*

UNITED STATES PATENT AND TRADEMARK OFFICE
CERTIFICATE OF CORRECTION

| | |
|---|---|
| PATENT NO. | : 12,045,778 B2 |
| APPLICATION NO. | : 16/556848 |
| DATED | : July 23, 2024 |
| INVENTOR(S) | : Kapil Sardesai et al. |

It is certified that error appears in the above-identified patent and that said Letters Patent is hereby corrected as shown below:

On the Title Page

At (72) Inventors: Please correct to read --Kapil Sardesai, Bengaluru (IN); Sujith Surendran, Bangalore (IN); Santhosh Venkata Rama Siva Thanakala Gani, Bangalore (IN); Prashanth Nimmagadda, Bangalore (IN); Nikhil Chandna, Bangalore (IN); Kala Sagar Pogiri, Karnataka (IN); Mohammad Kazi, Bangalore (IN); Roopali Rawat, Bangalore (IN)--

Signed and Sealed this
First Day of October, 2024

Katherine Kelly Vidal
*Director of the United States Patent and Trademark Office*